(12) United States Patent
Bushell et al.

(10) Patent No.: US 7,941,582 B2
(45) Date of Patent: May 10, 2011

(54) METHOD AND APPARATUS FOR MEDIATING AMONG MEDIA APPLICATIONS

(75) Inventors: John Samuel Bushell, San Jose, CA (US); James D. Batson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/725,745

(22) Filed: Mar. 17, 2010

(65) Prior Publication Data

US 2010/0241697 A1    Sep. 23, 2010

Related U.S. Application Data

(63) Continuation of application No. 11/841,716, filed on Aug. 20, 2007, now Pat. No. 7,721,032.

(60) Provisional application No. 60/946,958, filed on Jun. 28, 2007.

(51) Int. Cl.
*G06F 12/00* (2006.01)
(52) U.S. Cl. ............................ 710/240; 710/40; 709/232
(58) Field of Classification Search .................. 710/260, 710/262, 240, 40; 709/231, 232; 379/208.01
See application file for complete search history.

(56) References Cited

U.S. PATENT DOCUMENTS

| 6,389,473 | B1 | 5/2002 | Carmel et al. |
| 2006/0218294 | A1 | 9/2006 | Rosenberg |
| 2007/0275749 | A1 | 11/2007 | Vermola et al. |
| 2008/0037753 | A1 | 2/2008 | Hofmann |
| 2008/0235286 | A1 | 9/2008 | Hutson et al. |

*Primary Examiner* — Clifford H Knoll
(74) *Attorney, Agent, or Firm* — Ropes & Gray LLP; Jeffrey H. Ingerman (57) ABSTRACT

In a device that can execute multiple media applications, but only one at a time, a media server coordinates among applications, but neither the media server nor the individual applications maintain rules regarding all of the different applications. Each connection used by an application is assigned a priority and communicates that priority to the media server when the connection is established. When an application requests to begin playback, the request is granted if no other application is playing, or if another application is playing on a connection having a priority at most equal to that of the connection used by the requesting application, but is denied if the connection already in use has a higher priority. Resumption of an application that was interrupted by another application on a connection with higher priority is determined by the interrupted application after the interruption ends, based on information communicated by the media server.

43 Claims, 5 Drawing Sheets

METHOD AND APPARATUS FOR MEDIATING AMONG MEDIA APPLICATIONS

CROSS REFERENCE TO RELATED APPLICATIONS

This is a continuation of copending, commonly-assigned U.S. patent application Ser. No. 11/841,716, filed Aug. 20, 2007, now U.S. Pat. No. 7,721,032, which is hereby incorporated by reference herein in its entirety, and which claims the benefit of commonly-assigned U.S. Provisional Patent Application No. 60/946,958, filed Jun. 28, 2007.

BACKGROUND OF THE INVENTION

This invention relates to mediating among media applications on a device, to determine which application should be playing.

In a device capable of a plurality of different media applications, it frequently is the case that only one media application can be played back to the user at any one time. A media application may be defined as any application that causes media to be played, even if only incidentally. Thus, in a multifunction device that may include, for example, at least a mobile telephone, an audio (e.g., music) player, a video player, a calendar application, and an Internet/World Wide Web browser (with, e.g., a wireless broadband connection), there may be several audio applications—e.g., the telephone ringtone generator, the music player, the alarm/reminder tone generator of the calendar application, and the browser (which may invoke its own audio playback session)—that can play audio, just as there may be more than one application—e.g., the video player and the browser (which may invoke its own video playback session)—that can play video. Typically, only one audio playback and/or one video playback can occur at any one time, particularly in a device with limited processing capability such as a handheld device. Therefore, a way is required to determine which application, among competing applications that all want to play, can play.

The problem may be further complicated when one application is already playing and another application wants to begin playing. This, in fact, is more likely the situation, as it is unlikely that multiple applications will both want to begin playing at precisely the same time. For example, in the multifunction device described above, the user may have initiated playback of a music file, and while the music is playing, an incoming telephone call necessitates playback of a ringtone. Whether and when, in fact, the second application can interrupt the first application may be decided based on predetermined priorities. In addition, when a first application is interrupted by a second application, a decision must be made regarding resumption, or not, of the first application upon termination of the second application. A predetermined set of rules may determine when an application is resumed and when it is not.

One known solution to this problem is for every application to "know" about the existence of every other application and when another application wants to play, and for the applications to decide among themselves, based on a predetermined matrix of (a) priorities and (b) rules for resumption, which application can interrupt another and whether the interrupted application will resume. However, such a solution requires complex programming of every application, as well as reprogramming of existing applications when a new application is added. In addition, it requires that each application be kept advised of the status of each other application.

It would be desirable to be able to mediate among various media applications in a device without each application having to be aware of, and having to take into account, each other application.

SUMMARY OF THE INVENTION

Although various media, including at least audio and video media, may be involved, for convenience, the discussion below will focus on audio media. It should be understood, however, that the principles of the invention apply to any media.

In accordance with the present invention, a media server in the device mediates among the various media applications. Thus, any media application that wants to initiate playback must make a request to the media server, which will then grant or deny the request. If the request is granted, and if the granting of the request requires the interruption of playback of another media application, the media server will send a message to the other application at the beginning of the interruption, at the end of the interruption, or both. The interrupted application will use information in one or both of those messages to determine whether or not that other application resumes playback upon completion of playback of the interrupting application.

The media server can be programmed with the aforementioned matrix of priorities and rules. However, that would still require reprogramming of the media server every time a new application is added. While that is better than having to reprogram every application to account for the new application, according to another alternative embodiment, each application, when it intends to play and/or when it finishes playing, sends a message to the media server containing various items of information, or "tags." Similar messages may be sent on the establishment of the respective connection used by each application, which generally occurs ahead of time. The information or tags of those messages, from either the application or the connection, may relate to the identity of the application or connection, its priority (preferably this relates to the connection), and other information as described below. The media server in this embodiment is programmed with rules as to how to handle various priorities and the other information in the messages. These rules rarely need to be changed, even when additional applications are added to the system. Instead, one might have to change only the message or messages that an existing application or its connection sends (e.g., the application's connection's priority), and then only if the addition of the new application requires changes of those messages.

According to an implementation of this embodiment, when a connection is established between an application and the media server, it sends a message including a tag indicating its priority. When that application subsequently sends a request to the media server to be allowed to play some content on that connection, the media server can grant or deny the request based on the application's priority, as determined when the connection was established, relative to the priorities of other applications that are playing, if any. Thus, according to one variant of this implementation, if the priority is lower than that of an application that is already playing, then the media server will refuse the request. But if the priority is the same or higher than the priority of an application that is already playing, the media server will grant the request and the application that is already playing will be interrupted. This "rule" can be expressed as "higher priority wins, and among equal priorities, most recent wins." Implicit in this "rule" is that if no other application is already playing, the request is granted (because any priority is higher than no priority).

In one embodiment, the actual decision as to whether or not an interrupted application will resume playback after the interruption is over is made by the interrupted application. That decision, however, can be facilitated by a message or messages that the media server sends to the interrupted application, which in turn may be determined, at least in part, by information sent to the media server by the interrupting application, as described in more detail below.

Therefore, in accordance with the present invention, there is provided a method of controlling which of a plurality of media applications can be played in a device. The method includes providing a media server in the device and establishing a respective connection for each of those applications to that media server, where each respective connection has an assigned priority. Establishment of the connections includes, for each respective connection, sending a message communicating the assigned priority to the media server. A request to play is sent from one of the applications to the media server. When the assigned priority of the respective connection for the requesting application is lower than the assigned priority of the respective connection for another application that is playing, the request is denied at the media server. When the assigned priority of the respective connection for the requesting application is at least equal to the assigned priority of the respective connection for that other application, the request is granted at the media server.

Apparatus operating in accordance with the method is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described in the context of the multifunction device discussed above. It should be understood, however, that the invention is not limited to any one particular type of device.

In a device that includes a mobile telephone, as well as various media playing functions (in addition to the ringtone generator of the mobile telephone), different media playing functions may compete with each other. Thus, because a user will ordinarily want to be advised of incoming telephone calls regardless of whatever else he or she is using the device for, one ordinarily would want the playing of a ringtone to interrupt any other media—e.g., stored music—that might be playing. If the user declines to answer the call, ordinarily one would want the music to resume. Similarly, if the user accepts the call, ordinarily one would want the music to resume after the user completes the call.

However, once a media application, considered generically, has been interrupted, there are various ways to handle resumption of that application, particularly where there have been multiple interruptions. Thus, one could stack all of the applications, resuming each application as the most recent interrupting application terminates, until the stack is clear and the original application resumes. In one embodiment of the invention, however, most applications are not stacked. In fact, in that embodiment, only an alarm or reminder is stacked, so that if an alarm or reminder arrives and plays a sound while another application is already interrupted (e.g., music is interrupted for a telephone call), then the other application that is interrupted will resume after both the alarm/reminder and the original interruption are over. However, if in that embodiment any other media application is initiated during an interruption—e.g., during a phone call, the user browses to a web page and initiates an audio playback for the benefit of the other caller—the original application is not resumed after all other interruptions.

One way of handling this stacking arrangement, without having to have a lot of complicated rules in the media server, is to have the connection for the interrupting application, when it sends its initial message to the media server requesting connection and indicating its priority level, also send an indication of whether it is stackable. If the connection for a current interrupting application is stackable, the application will be stacked atop the other interrupted application(s) which will eventually resume when the current interrupting application terminates, but if it is not, the other application(s) will be "pushed out the bottom" of the stack and will not resume when the current interrupting application terminates. In the embodiment described, the connection for an alarm/reminder would include an indication or tag of "stackable" in its message to the media server, while the connection for any other application would indicate that it is not stackable (or alternatively would simply not indicate that it is stackable).

In the embodiment described, whether or not an interrupted application resumes is determined by that application (assuming it has not been pushed out of the stack by another application). Some applications never resume. For example, in this embodiment, an alarm that is interrupted never resumes (because the time indicated by the alarm may have passed by the time the interruption is over). On the other hand, for applications that can resume, the other kind of information referred to above, that can be included in a message from an interrupting application to the media server, is information that can be used by an interrupted application to determine whether or not to resume. Thus, the message can include data, or "tags," that can be forwarded by the media server to the interrupted application. These can include an "interruption name" tag to be sent on interruption advising of the interruption and identifying the interrupting application (e.g., "You have been interrupted by ______"), as well as an "interruption status" tag to be sent when the interruption is completed, specifying the completion.

Not all interrupting applications necessarily send an "interruption name" or "interruption status" tag. For many interruptions, resumption of the interrupted application is not expected. For these types of interruptions, which can be referred to as "implicit" interruptions, the media server could send a generic "interruption has begun" message and a generic "interruption has ended" message. Therefore, for implicit interruptions, it is not necessary for the interrupting application to send an "interruption name" or "interruption status" tag. The media server can simply send the generic "interruption has begun" message at the beginning of the interruption, and the generic "interruption has ended" message when it detects that playback of the interrupting content has stopped.

For certain types of interruptions, however, resumption of the interrupted application would be expected, but it may not be clear implicitly when the interruption is over. For example, if the interruption is an incoming telephone call, the reason to interrupt any media that is playing is that the ringtone, which also is a form of media, must be played. However, the interruption does not end when playing of the ringtone itself is complete. Instead, the interruption ends when the user either declines the incoming call, or accepts and then completes the call. The audio portion of the call itself is handled in this embodiment by other applications in the device and is not considered media. Thus, an explicit indication that the interruption is over is required in this embodiment. Therefore, applications such as incoming telephone calls issue "explicit" interruptions. For an explicit interruption, the message to the media server includes a particular "you have been interrupted by" notification, so that when that message is delivered to the interrupted application, the interrupted application has the necessary information to handle the resume/do-not-resume decision. In addition, because the end of the interruption cannot be inferred from the end of playing of the interrupting media (the ringtone), an explicit "interruption has ended" message is sent in this embodiment by the interrupting application (e.g., the telephone call application) and passed on by the media server to the interrupted application.

When an application that has been interrupted is pushed out of the stack by an unstackable further interruption, of the type described above, it can remain running and resident essentially indefinitely until the user turns off the device or the device battery is depleted, unless the user returns to the application manually. For example, if a music player application is interrupted by a telephone call, which is further interrupted by a web media playback session, the original music player application in this embodiment will not resume automatically on termination of the telephone call, because the web media playback application in this embodiment is not stackable. When the user has completed all of the interrupting activities, and realizes that the music has not resumed, the user can return manually to the music player application, and either terminate it or resume it manually. In the latter case, the music player can remember its position at the time of interruption and resume playing from that position.

The invention will now be described with reference to FIGS. 1-5.

Figure 1:
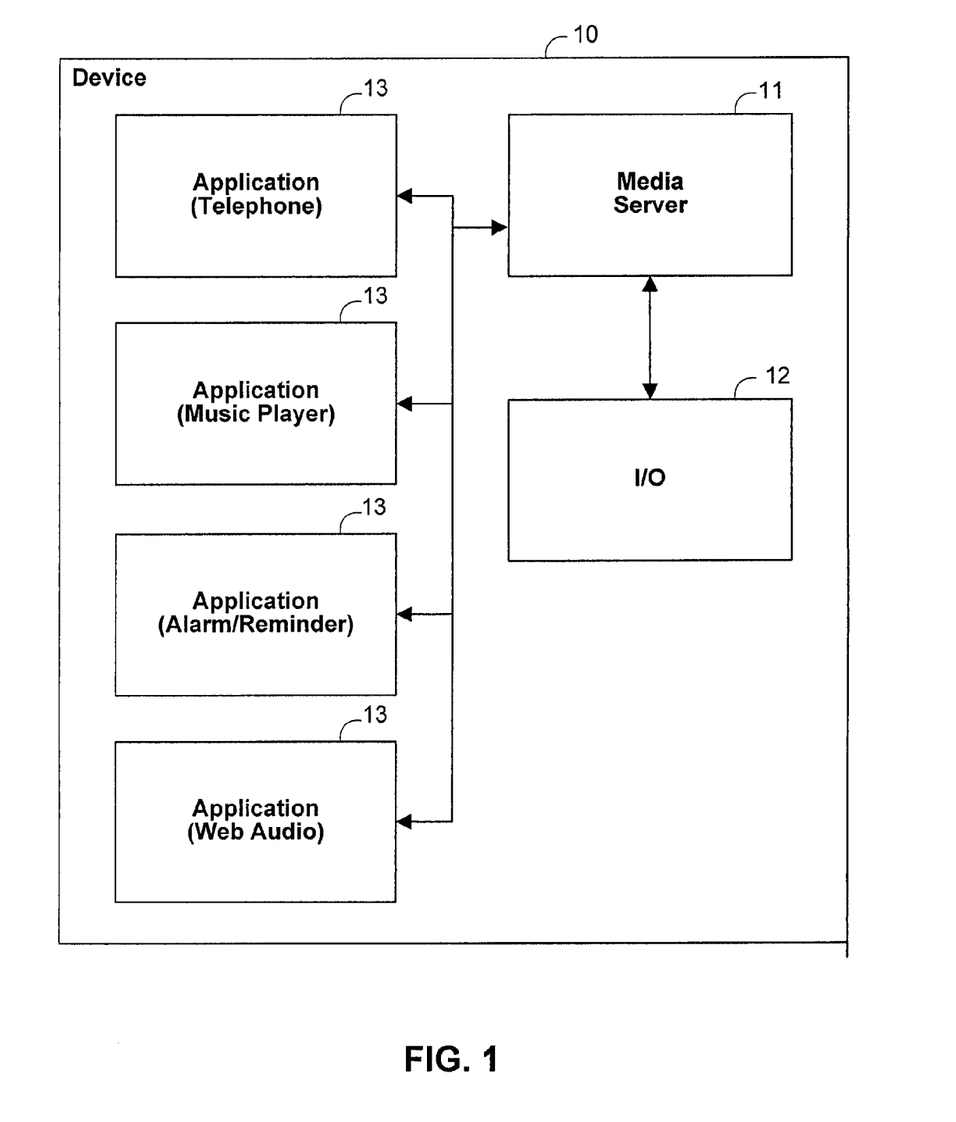
FIG. 1 is a block diagram of a device or method in accordance with the present invention.

FIG. 1 shows a method or apparatus 10 in accordance with the present invention. While one embodiment of the invention can be implemented as software in a processor of a device of the type described, it also can be implemented in hardware.

Thus, in a software embodiment, "device" 10 is implemented in a processor of a device of the type described. Media server 11, I/O module 12 and applications 13 are software modules running on that processor, with I/O module 12 driving I/O hardware including one or more speakers (not shown). Each application 13 may not actually be a separate application; several applications 13 can be individual clients or instances of one application. For example, both the music player and the web audio application can be instances of the same application.

In a hardware embodiment, device 10 can include separate hardware or firmware modules (e.g., separate integrated circuit devices) for media server 11, I/O module 12 and various applications 13.

In either embodiment, media server 11 grants or denies permission to any of applications 13 to play based on the requesting application's priority, as communicated by that application to media server 11, as compared to the priority of any application 13 already playing. Each application 13 makes its own decision on resumption after the interruption, based on information communicated to it by media server 11. That information can originate with the interrupting application, which can communicate the information to media server 11.

It should further be noted that the term "media server" is arbitrary in the context of the current invention, and refers to any hardware or firmware, or software application, service or process, in the device, that performs the functions ascribed herein to the media server.

Figure 2:
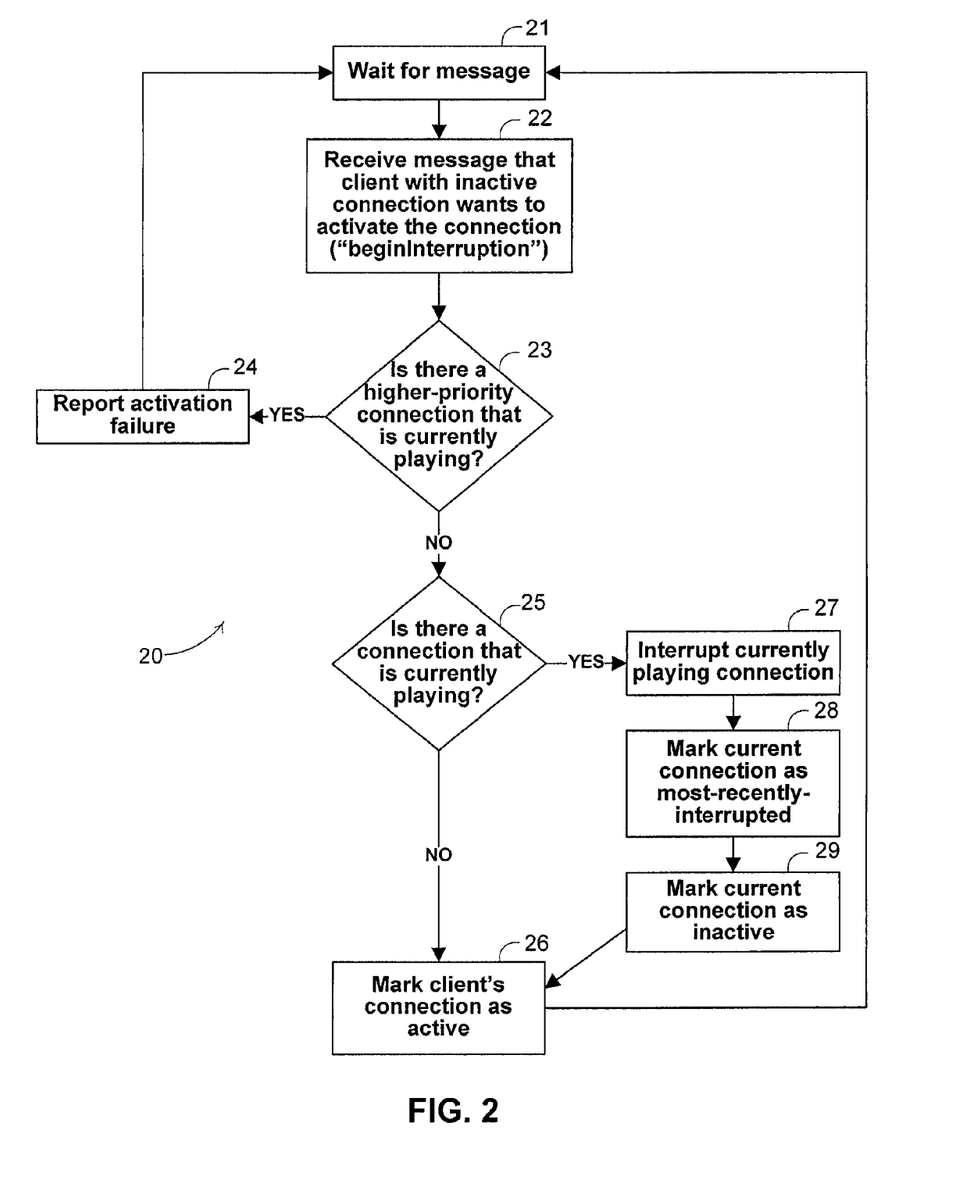
FIG. 2 is a flow diagram illustrating how a media server in the present invention handles a request to begin playback.

FIG. 2 shows process 20 by which a media server in the present invention handles a request to begin playback. At step 21, the media server waits for a message. At step 22, a message is received that a client of one of the system applications that currently has an inactive connection wants to activate that connection. (As previously noted, a connection to each application is defined initially, including the priority assigned to the connection.) Next, at test 23, the media server determines whether or not a connection with a higher priority is already playing. If so, then activation failure is reported at step 24, and the media server returns to step 21 to await a further message.

If, at test 23, a higher-priority connection is not already playing, the media server moves to test 25 to determine whether any connection (of any priority) is playing. If not, then the requesting application can be allowed to play, and at step 26 the connection is marked as "active" and the media server returns to step 21 to await a further message.

If, at test 24, another connection is playing, then that connection must have the same or lower priority (because this is the "No" branch of test 23). Accordingly, at step 27, that currently-playing connection is interrupted. At step 28, the now-interrupted "current" connection is marked as most-recently-interrupted" (this is used later for resumption as described below), and also at step 29 as inactive. Any previously interrupted application is forgotten, unless the connection for the current interruption is stackable (not shown). The media server then moves to step 26 and proceeds as above.

Figure 3:
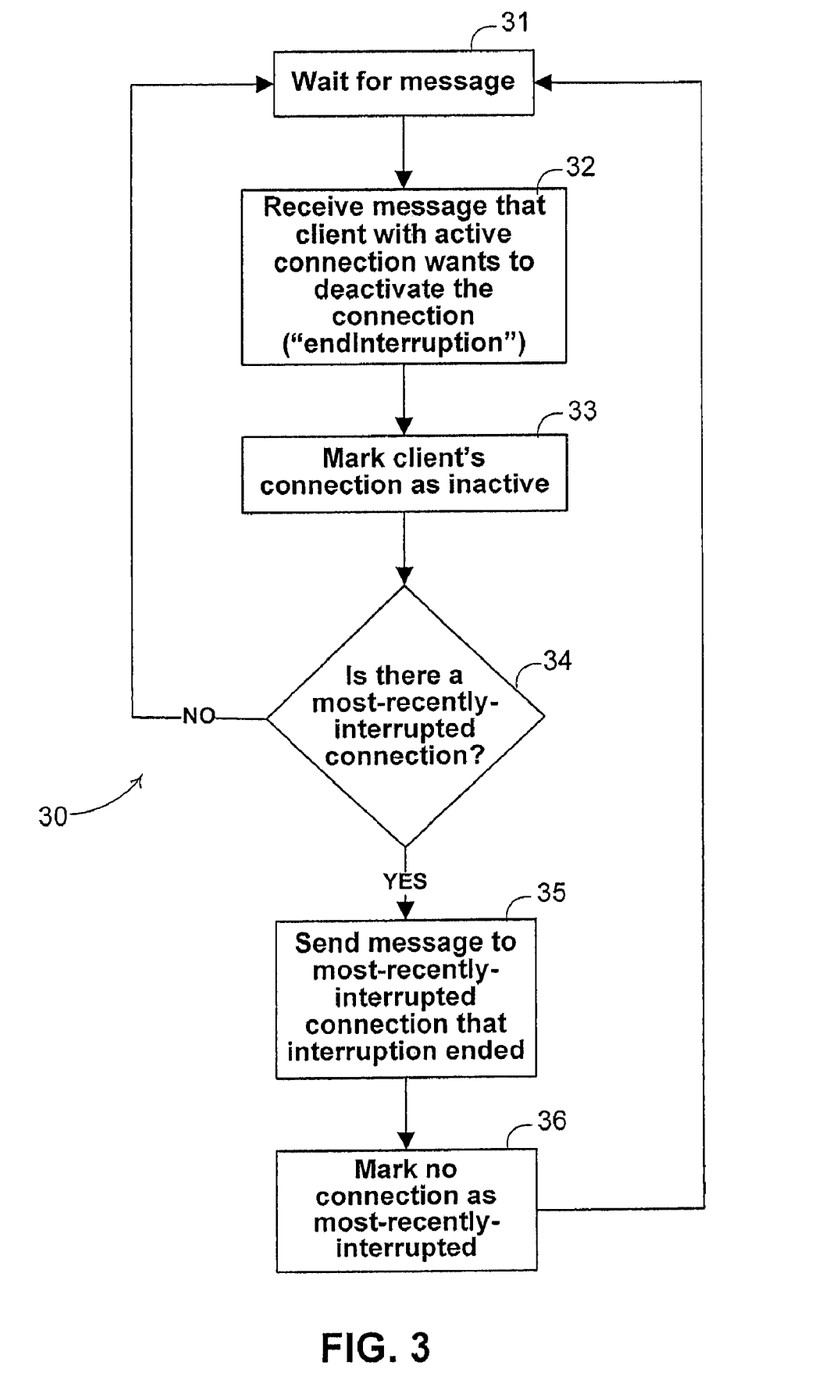
FIG. 3 is a flow diagram illustrating how a media server in the present invention handles the ending of playback.

FIG. 3 shows process 30 by which a media server in the present invention handles the end of playback. At step 31, the media server waits for a message. At step 32, a message is received that the currently-playing client wants to deactivate its connection (e.g., after terminating a telephone call). At step 33, the media server marks the connection as inactive, and then at test 34 determines if there is another connection marked as most-recently-interrupted (see step 28). If not, the playback session that just ended had not interrupted any other session when it began, and so the media server returns to step 31 to await a further message.

However, if at test 34, the media server determines that there is another connection marked as most-recently-interrupted, then at step 35, the media server sends a message to that most-recently-interrupted connection that the interruption has ended (so that the application for that connection can determine whether or not to resume). At step 36, it is noted that now no connection is most-recently-interrupted, and the media server returns to step 31 to await a further message, unless the connection for the just-ended interruption was stackable, in which case the previous most-recently interrupted application rises back to the most-recently interrupted position at the top of the stack (not shown).

Figure 4:
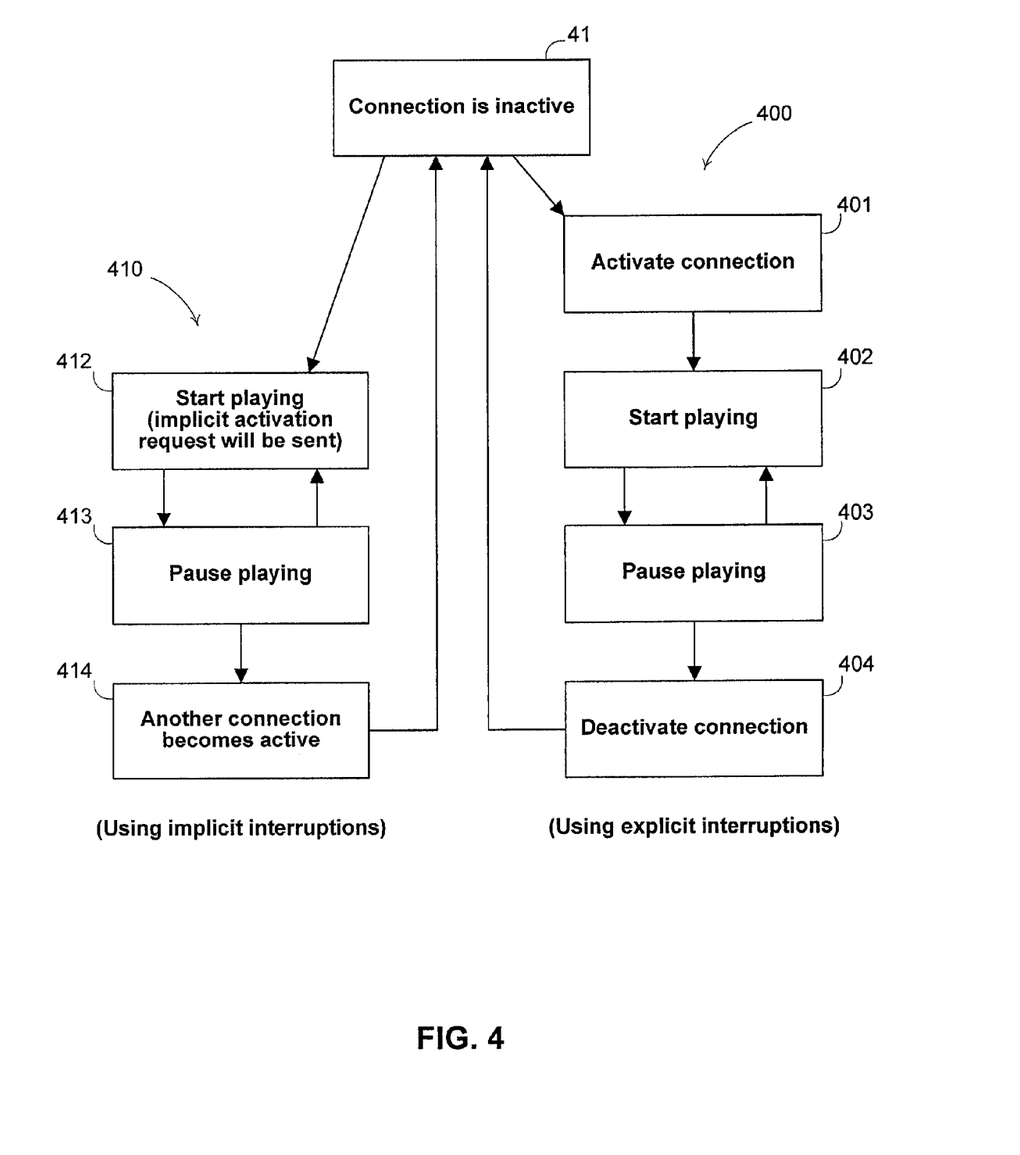
FIG. 4 is a flow diagram illustrating the handling of implicit and explicit interruptions.

FIG. 4 shows how connections are activated and deactivated in the present invention in the case of implicit and explicit interruptions. In either case, a connection must be active to play media. Any attempt to play implicitly requests that the corresponding connection be activated, but a client also may make an explicit request to activate (or deactivate a connection). When a connection is activated or deactivated, the processes of FIGS. 2 and 3 are invoked.

Both explicit interruption path 400 and implicit interruption path 410 begin at step 41 with an inactive connection. In the case 400 of an explicit interruption, the connection is activated at step 401 (see FIG. 2) and playback begins at step 402. Playback step 402 continues, possibly cycling through pauses 403, until it is completed, and explicitly deactivated at step 404 (see FIG. 3), and returns to the inactive state 41.

In the case 410 of an implicit interruption, an inactive connection (step 41) is implicitly activated (no separate step), starts playing at step 412, and continues, possibly cycling through pauses 413, until another connection becomes active at step 414. In the absence of an explicit request by this application to deactivate, this can only happen if another equal or higher-priority connection is activated (see FIG. 2). As a result, the current connection implicitly returns to the inactive state 41.

Figure 5:
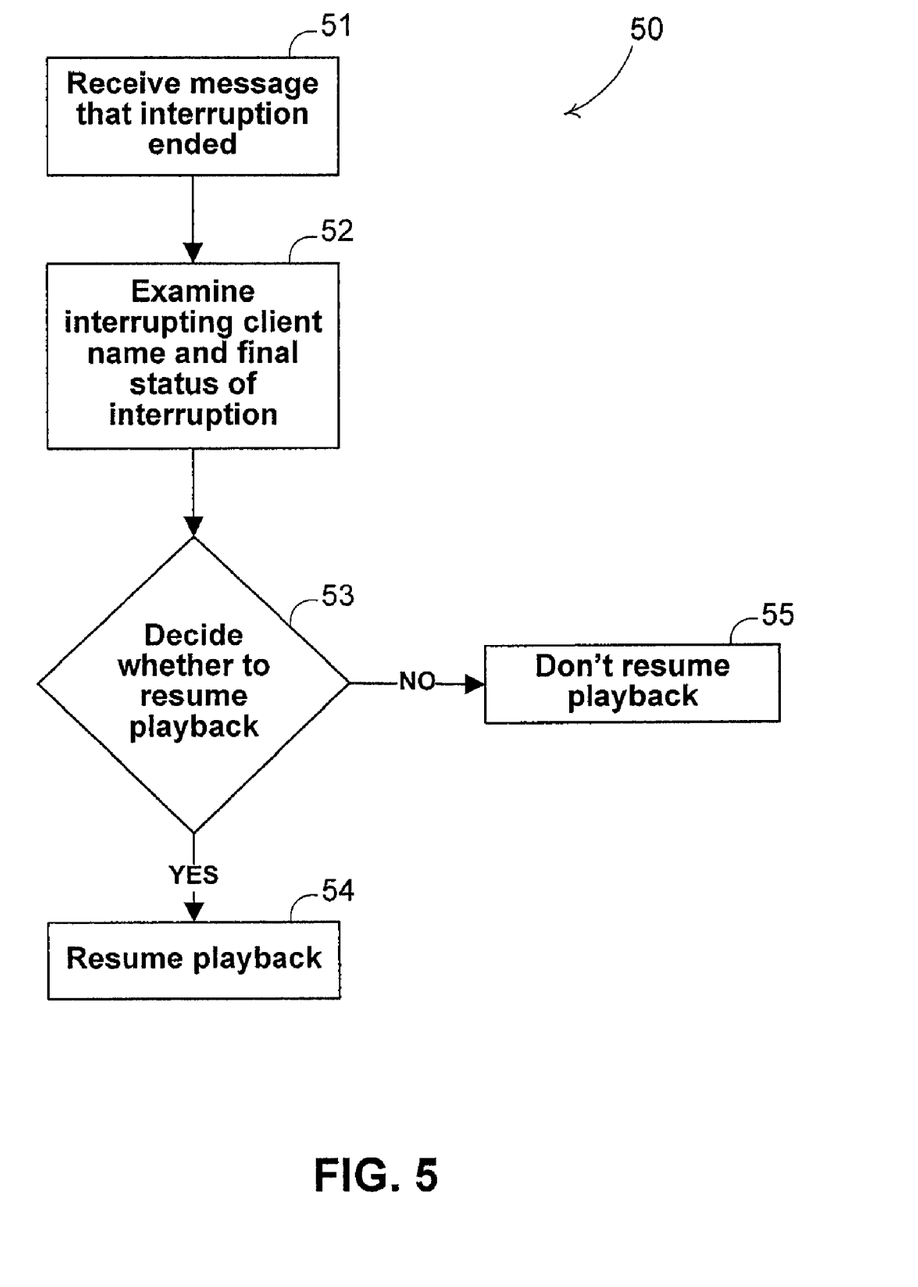
FIG. 5 is a flow diagram illustrating how an interrupted application in the present invention decides whether or not to resume.

FIG. 5 shows the process 50 by which an interrupted application in the present invention decides whether or not to resume. At step 51, the interrupted application receives a message that the interruption has ended (see step 35). At step 52, the interrupted application examines the message and notes the name of the interrupting client and the interruption status. At test 53, the application, using rules particular to itself, as discussed above, decides whether to resume playback (step 54) or not to resume playback (step 55).

Thus it is seen that a method or apparatus for playing media applications, with interruptions of one application by another, without the need for complicated rules or knowledge of one application by the other, has been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of operating a device having a media server therein, for controlling which of a plurality of media applications can be played in the device, said method comprising:
    establishing a respective connection for each respective one of said applications to said media server, each said respective connection having an assigned priority, said establishing including, for each respective connection, sending of a message automatically by one of (a) said respective one of said applications, or (b) said respective connection, communicating said assigned priority to said media server;
    sending a request to play from one of said applications to said media server;
    when said assigned priority of said respective connection for said requesting application is lower than an assigned priority of said respective connection for another application that is playing, denying said request at said media server; and
    when said assigned priority of said respective connection for said requesting application is at least equal to said assigned priority of said respective connection for said another application, granting said request at said media server.

2. The method of claim 1 wherein, when said another application is playing and said request is granted:
    said another application is interrupted; and
    said media server communicates information to said another application that is used by said another application to determine whether to resume when said interruption is completed.

3. The method of claim 2 wherein said information communicated by said media server to said another application is communicated to said media server by said requesting application.

4. The method of claim 2 wherein said media server communicates to said another application when said interruption is completed.

5. The method of claim 4 wherein:
    said establishing a respective connection includes sending an indication of whether said respective connection is stackable;
    when a further application makes a further one of said requests during said interruption and said respective connection for said further application is stackable, when said further application and said requesting application are complete, communicating to said another application that interruption of said another application is complete; and
    when said further application makes said further one of said requests during said interruption and said respective connection for said further application is not stackable, when said further application and said requesting application are complete, ending playback without communicating to said another application that interruption of said another application is complete.

6. The method of claim 4 wherein said media server detects when said interruption is completed.

7. The method of claim 4 wherein said requesting application explicitly communicates to said media server that said interruption is completed.

8. The method of claim 7 wherein at least a portion of said information communicated by said media server to said another application is sent to said media server in said explicit communication.

9. The method of claim 2 wherein at least a portion of said information communicated by said media server to said another application is sent to said media server in said request.

10. The method of claim 9 wherein said at least a portion of said information includes information identifying said requesting application.

11. Apparatus for playing a plurality of media applications, said apparatus comprising:
    a media server for mediating among said applications; wherein:
    a respective connection is established for each respective one of said applications to said media server, each said respective connection having an assigned priority, said establishing including, for each respective connection, automatic sending of a message by one of (a) said respective one of said applications, or (b) said respective connection, communicating said assigned priority to said media server;
    one of said applications sends a request to play to said media server;
    when said assigned priority of said respective connection for said requesting application is lower than an assigned priority of said respective connection for another application that is playing, said media server denies said request; and when said assigned priority of said respective connection for said requesting application is at least equal to said assigned priority of said respective connection for said another application, said media server grants said request.

12. The apparatus of claim 11 wherein, when said another application is playing and said request is granted:

said another application is interrupted; and said media server communicates information to said another application that is used by said another application to determine whether to resume when said interruption is completed.

13. The apparatus of claim 12 wherein said information communicated by said media server to said another application is communicated to said media server by said requesting application.

14. The apparatus of claim 12 wherein said media server communicates to said another application when said interruption is completed.

15. The apparatus of claim 14 wherein:

establishment of said respective connection includes an indication of whether said respective connection is stackable;

when a further application makes a further one of said requests during said interruption and said respective connection for said further application is stackable, when said further application and said requesting application are complete, said apparatus communicates to said another application that interruption of said another application is complete; and when said further application makes said further one of said requests during said interruption and said request by said further application indicates that said further application is not stackable, when said further application and said requesting application are complete, said apparatus ends playback without communicating to said another application that interruption of said another application is complete.

16. The apparatus of claim 14 wherein said media server detects when said interruption is completed.

17. The apparatus of claim 14 wherein said requesting application explicitly communicates to said media server that said interruption is completed.

18. The apparatus of claim 17 wherein at least a portion of said information communicated by said media server to said another application is sent to said media server in said explicit communication.

19. The apparatus of claim 12 wherein at least a portion of said information communicated by said media server to said another application is sent to said media server in said request.

20. The apparatus of claim 19 wherein said at least a portion of said information includes information identifying said requesting application.

21. The apparatus of claim 11 further comprising a processor, wherein said media server is in said processor.

22. The apparatus of claim 21 wherein each of said applications is played by said processor.

23. The apparatus of claim 11 further comprising:

at least one processor including a plurality of processing units corresponding to said plurality of media applications; wherein:

said media server comprises a separate processing unit.

24. A method of operating a media server in a device, for controlling which of a plurality of media applications can be played, said method comprising:

establishing a respective connection for each respective one of said applications to said media server, each said respective connection having an assigned priority, said establishing including, for each respective connection, sending of a message automatically by one of (a) said respective one of said applications, or (b) said respective connection, communicating said assigned priority to said media server;

sending a request to play from one of said applications to said media server;

when said assigned priority of said respective connection for said requesting application is lower than an assigned priority of said respective connection for another application that is playing, denying said request at said media server; and when said assigned priority of said respective connection for said requesting application is at least equal to said assigned priority of said respective connection for said another application, granting said request at said media server.

25. The method of claim 24 wherein, when said another application is playing and said request is granted:

said another application is interrupted; and said media server communicates information to said another application that is used by said another application to determine whether to resume when said interruption is completed.

26. The method of claim 25 wherein said information communicated by said media server to said another application is communicated to said media server by said requesting application.

27. The method of claim 25 wherein said media server communicates to said another application when said interruption is completed.

28. The method of claim 27 wherein:

said establishing a respective connection includes sending an indication of whether said respective connection is stackable;

when a further application makes a further one of said requests during said interruption and said respective connection for said further application is stackable, when said further application and said requesting application are complete, communicating to said another application that interruption of said another application is complete; and when said further application makes said further one of said requests during said interruption and said respective connection for said further application is not stackable, when said further application and said requesting application are complete, ending playback without communicating to said another application that interruption of said another application is complete.

29. The method of claim 27 wherein said media server detects when said interruption is completed.

30. The method of claim 27 wherein said requesting application explicitly communicates to said media server that said interruption is completed.

31. The method of claim 30 wherein at least a portion of said information communicated by said media server to said another application is sent to said media server in said explicit communication.

32. The method of claim 25 wherein at least a portion of said information communicated by said media server to said another application is sent to said media server in said request.

33. The method of claim 32 wherein said at least a portion of said information includes information identifying said requesting application.

34. A media server for mediating among a plurality of media applications, said media server comprising:
- a respective connection for each respective one of said applications to said media server, each said respective connection having an assigned priority; wherein:
- one of (a) said respective one of said applications, or (b) said respective connection, automatically sends a message communicating said assigned priority to said media server,
- one of said applications sends a request to play to said media server,
- when said assigned priority of said respective connection for said requesting application is lower than an assigned priority of said respective connection for another application that is playing, said media server denies said request, and
- when said assigned priority of said respective connection for said requesting application is at least equal to said assigned priority of said respective connection for said another application, said media server grants said request.

35. The media server of claim 34 wherein, when said another application is playing and said request is granted:
- said another application is interrupted; and
- said media server communicates information to said another application that is used by said another application to determine whether to resume when said interruption is completed.

36. The media server of claim 35 wherein said information communicated by said media server to said another application is communicated to said media server by said requesting application.

37. The media server of claim 35 wherein said media server communicates to said another application when said interruption is completed.

38. The media server of claim 37 wherein:
- establishment of said respective connection includes an indication of whether said respective connection is stackable;
- when a further application makes a further one of said requests during said interruption and said respective connection for said further application is stackable, when said further application and said requesting application are complete, said apparatus communicates to said another application that interruption of said another application is complete; and
- when said further application makes said further one of said requests during said interruption and said request by said further application indicates that said further application is not stackable, when said further application and said requesting application are complete, said apparatus ends playback without communicating to said another application that interruption of said another application is complete.

39. The media server of claim 37 wherein said media server detects when said interruption is completed.

40. The media server of claim 37 wherein said requesting application explicitly communicates to said media server that said interruption is completed.

41. The media server of claim 40 wherein at least a portion of said information communicated by said media server to said another application is sent to said media server in said explicit communication.

42. The media server of claim 35 wherein at least a portion of said information communicated by said media server to said another application is sent to said media server in said request.

43. The media server of claim 42 wherein said at least a portion of said information includes information identifying said requesting application.

* * * * *